US012587586B2

(12) United States Patent
Zihnioglu

(10) Patent No.:    US 12,587,586 B2
(45) Date of Patent:    Mar. 24, 2026

(54) REDUCING LATENCY AND OPTIMIZING PROXY NETWORKS

(71) Applicant: Webshare Software Company, Reading, CA (US)

(72) Inventor: Asim Utku Zihnioglu, Reading, CA (US)

(73) Assignee: Webshare Software Company, Covina, CA (US)

( * ) Notice:    Subject to any disclaimer, the term of this patent is extended or adjusted under 35 U.S.C. 154(b) by 577 days.

(21) Appl. No.: 17/881,004

(22) Filed: Aug. 4, 2022

(65) Prior Publication Data

US 2024/0048625 A1    Feb. 8, 2024

(51) Int. Cl.
H04L 67/141    (2022.01)
H04L 61/256    (2022.01)
H04L 67/56    (2022.01)

(52) U.S. Cl.
CPC .......... H04L 67/141 (2013.01); H04L 61/256 (2013.01); H04L 67/56 (2022.05)

(58) Field of Classification Search
None
See application file for complete search history.

(56)    References Cited

U.S. PATENT DOCUMENTS

| | | |
|---|---|---|
| 8,560,604 B2 | 10/2013 | Shribman |
| 8,671,221 B2 | 3/2014 | Shribman |
| 9,241,044 B2 | 1/2016 | Shribman |
| 9,990,295 B2 | 6/2018 | Shribman |
| 10,616,294 B2 | 4/2020 | Shribman |
| 10,963,531 B2 | 3/2021 | Shribman |
| 10,985,934 B2 | 4/2021 | Shribman |
| 10,999,402 B2 | 5/2021 | Shribman |
| 11,005,967 B2 | 5/2021 | Shribman |
| 11,012,530 B2 | 5/2021 | Shribman |
| 11,038,989 B2 | 6/2021 | Shribman |
| 11,044,341 B2 | 6/2021 | Shribman |
| 11,044,342 B2 | 6/2021 | Shribman |
| 11,044,344 B2 | 6/2021 | Shribman |
| 11,044,345 B2 | 6/2021 | Shribman |

(Continued)

*Primary Examiner* — Tonia L Dollinger
*Assistant Examiner* — Ishrat Rashid
(74) *Attorney, Agent, or Firm* — Hickman Becker Bingham Ledesma LLP

(57)    ABSTRACT

In some implementations, a computer-implemented method comprises: establishing, by a proxy server configured in a first public network, a communications connection between the proxy server and a destination host configured in a second public network; wherein the communications connection established between the proxy server and the destination host comprises two or more sub-connections established between two or more network devices configured in a private network; wherein the proxy server configured in the first public network is agnostic of NATs of two or more network addresses of the network devices configured in the private network; wherein the network device, configured in the first public network, establishes the communications connection from the network device and the destination host via the network devices configured in the private network without acquiring information about the NATs of the network addresses of the network devices configured in the private network.

20 Claims, 9 Drawing Sheets

(56) References Cited

U.S. PATENT DOCUMENTS

| | | | |
|---|---|---|---|
| 11,044,346 B2 | 6/2021 | Shribman | |
| 11,050,852 B2 | 6/2021 | Shribman | |
| 11,057,446 B2 | 7/2021 | Shribman | |
| 11,089,135 B2 | 8/2021 | Shribman | |
| 11,102,326 B2 | 8/2021 | Shribman | |
| 11,115,230 B2 | 9/2021 | Shribman | |
| 11,128,738 B2 | 9/2021 | Shribman | |
| 11,178,250 B2 | 11/2021 | Shribman | |
| 11,178,258 B2 | 11/2021 | Shribman | |
| 11,190,374 B2 | 11/2021 | Shribman | |
| 11,190,622 B2 | 11/2021 | Shribman | |
| 11,206,317 B2 | 12/2021 | Shribman | |
| 11,228,666 B2 | 1/2022 | Shribman | |
| 11,233,872 B2 | 1/2022 | Shribman | |
| 11,233,879 B2 | 1/2022 | Shribman | |
| 11,233,880 B2 | 1/2022 | Shribman | |
| 11,233,881 B2 | 1/2022 | Shribman | |
| 11,272,034 B2 | 3/2022 | Shribman | |
| 11,297,167 B2 | 4/2022 | Shribman | |
| 11,303,734 B2 | 4/2022 | Shribman | |
| 11,310,341 B2 | 4/2022 | Shribman | |
| 11,316,950 B2 | 4/2022 | Shribman | |
| 11,336,745 B2 | 5/2022 | Shribman | |
| 11,336,746 B2 | 5/2022 | Shribman | |
| 11,349,953 B2 | 5/2022 | Shribman | |
| 2010/0024031 A1 | 1/2010 | Shribman | |
| 2010/0138909 A1* | 6/2010 | Chen | H04L 63/0209 |
| | | | 713/153 |
| 2017/0208032 A1* | 7/2017 | Cox | H04L 61/2514 |
| 2018/0234396 A1* | 8/2018 | Adams | H04L 67/141 |
| 2020/0059536 A1 | 2/2020 | Shribman | |
| 2021/0266354 A1 | 8/2021 | Shribman | |
| 2022/0116362 A1* | 4/2022 | Zihnioglu | G06F 9/45558 |
| 2022/0173924 A1 | 6/2022 | Shribman | |
| 2023/0118718 A1* | 4/2023 | Solanki | H04L 12/4633 |
| | | | 726/12 |
| 2023/0254284 A1* | 8/2023 | McCord | H04L 41/12 |
| | | | 726/15 |

* cited by examiner

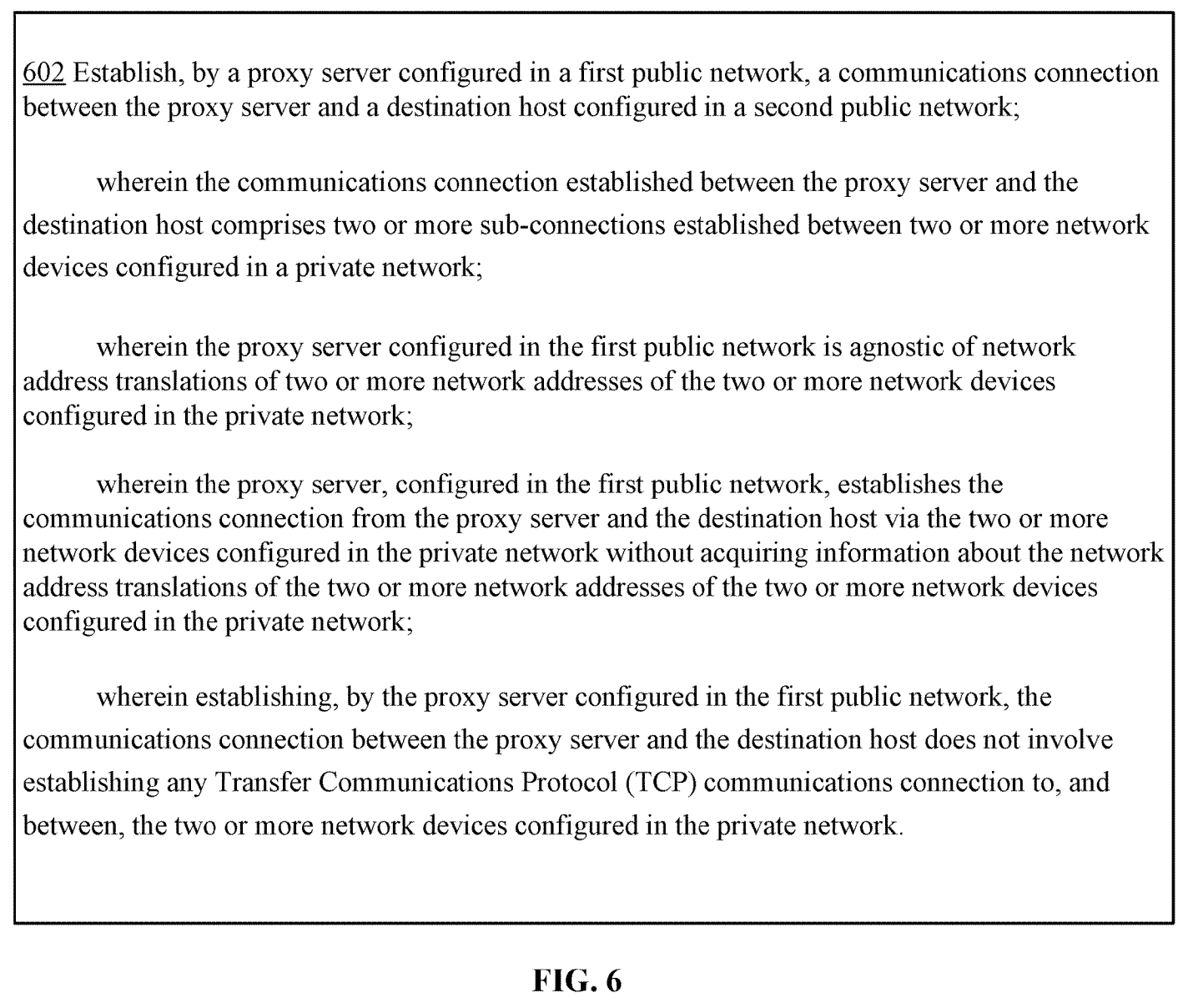

602 Establish, by a proxy server configured in a first public network, a communications connection between the proxy server and a destination host configured in a second public network;

wherein the communications connection established between the proxy server and the destination host comprises two or more sub-connections established between two or more network devices configured in a private network;

wherein the proxy server configured in the first public network is agnostic of network address translations of two or more network addresses of the two or more network devices configured in the private network;

wherein the proxy server, configured in the first public network, establishes the communications connection from the proxy server and the destination host via the two or more network devices configured in the private network without acquiring information about the network address translations of the two or more network addresses of the two or more network devices configured in the private network;

wherein establishing, by the proxy server configured in the first public network, the communications connection between the proxy server and the destination host does not involve establishing any Transfer Communications Protocol (TCP) communications connection to, and between, the two or more network devices configured in the private network.

FIG. 6

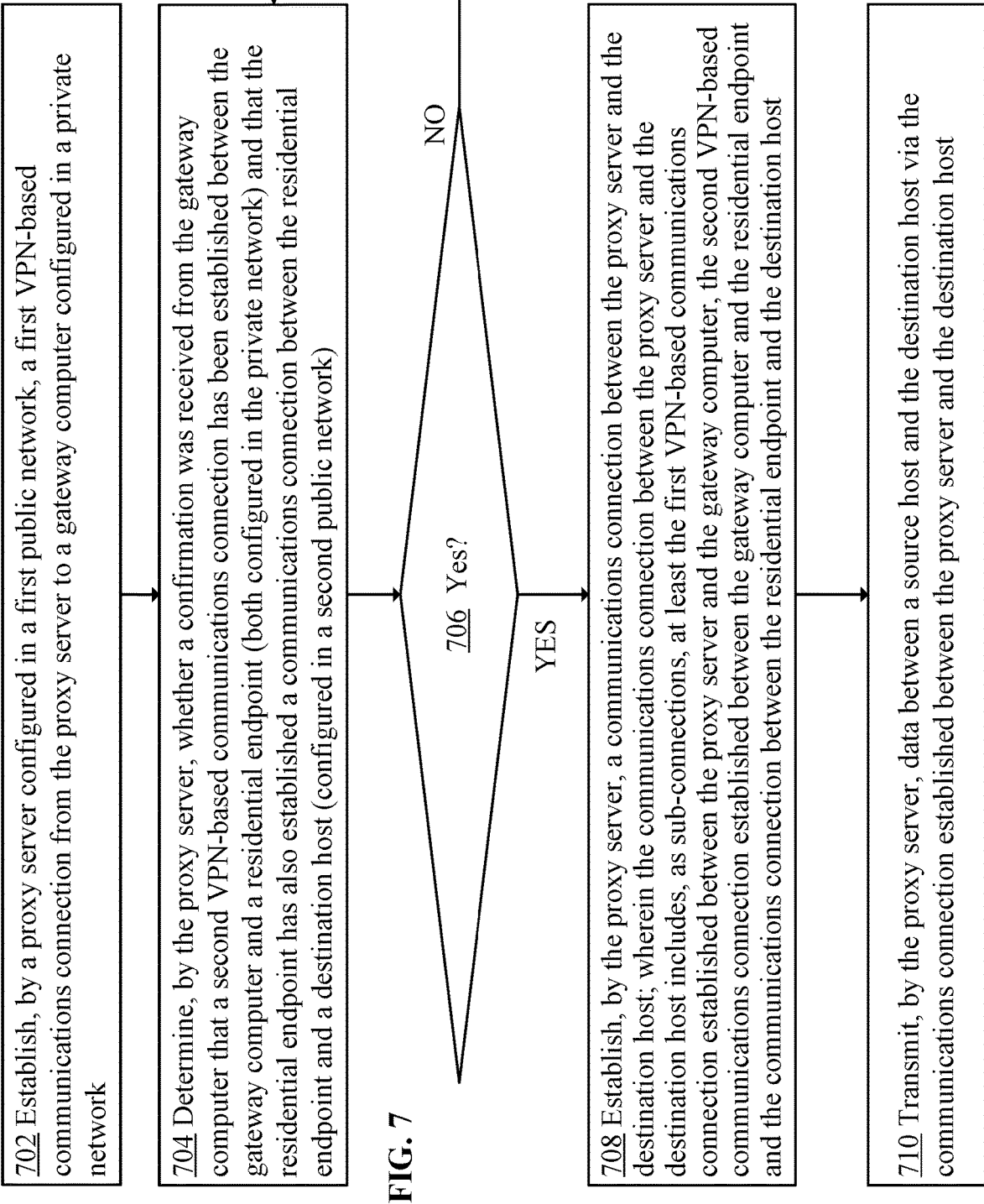

702 Establish, by a proxy server configured in a first public network, a first VPN-based communications connection from the proxy server to a gateway computer configured in a private network 704 Determine, by the proxy server, whether a confirmation was received from the gateway computer that a second VPN-based communications connection has been established between the gateway computer and a residential endpoint (both configured in the private network) and that the residential endpoint has also established a communications connection between the residential endpoint and a destination host (configured in a second public network)

706 Yes?

NO

YES

708 Establish, by the proxy server, a communications connection between the proxy server and the destination host; wherein the communications connection between the proxy server and the destination host includes, as sub-connections, at least the first VPN-based communications connection established between the proxy server and the gateway computer, the second VPN-based communications connection established between the gateway computer and the residential endpoint and the communications connection between the residential endpoint and the destination host 710 Transmit, by the proxy server, data between a source host and the destination host via the communications connection established between the proxy server and the destination host

FIG. 7

REDUCING LATENCY AND OPTIMIZING PROXY NETWORKS

TECHNICAL FIELD

The present disclosure relates to computer networking. More specifically, some embodiments of the present disclosure relate to reducing latency and optimizing proxy networks that provide access via private networks to destination hosts that are configured in public networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A proxy server is a computer server that is usually implemented as an intermediary between a source host (used by users) and a destination host (used to implement a website, a datacenter, or the like). The proxy server is often used to transfer network data between the source host and the destination host without revealing a network address of the destination to the source host and vice versa. The proxy server may, for example, receive a request from the source host indicating that the source host requests access to services from the destination host. In response to receiving the request, the proxy server can establish a communications connection between the source host and the destination host and enable the communications between the source and the destination.

Usually, a proxy server initiates a Transmission Control Protocol (TCP) communications connection between the proxy server and a source host to allow the source host to request and access resources of a destination host. If the proxy server implements the Hypertext Transfer Protocol (HTTP) or Socket Secure Protocol (SOCKS5), then the request from the source host may be an HTTP request or a SOCKS5 request. The request sent from the source host may identify the destination host by a destination domain name and a destination port (e.g., default 443 for HTTPS or 80 for HTTP).

If a proxy network is separated from a destination host by a private network, then the proxy server cannot communicate with the destination host directly. A private network usually implements several gateways and residential endpoints. The gateways in the private network may be used to, for example, provide security measures for the residential endpoints, which in turn may communicate with the destination host. The gateways may also perform a network address translation (NAT) for the residential endpoints implemented in the private network.

In such situations, a proxy server may use, for example, a gateway to facilitate communications with a destination host. In turn, the gateway may communicate with a residential endpoint implemented in the same private network. However, the residential endpoint may be implemented behind a firewall, and thus the residential endpoint may have a network address that is unavailable to the proxy server. Therefore, the proxy server itself cannot connect to the residential endpoint. However, the proxy server may connect directly to the gateway implemented between the proxy server and the residential endpoint. Therefore, the proxy server needs to rely on the gateway for handling the communications connection with the residential endpoint.

Typically, several TCP communications connections are established in these situations: a connection between a source host and a proxy server, a connection between the proxy server and a gateway, a connection between the gateway and a residential endpoint, and a connection between the residential endpoint and a destination host. However, establishing each TCP connection is time consuming, especially in situations where the proxy server attempts to connect to the destination host via computer entities implemented in a private network in which the gateways handle the NATs. Even if some TCP connections could be preestablished in advance, the fact that a large quantity of such connections needs to be preestablished, the process may be time consuming and may impede the performance of the proxy server and the proxy network as a whole.

Therefore, there is a need to develop an approach that optimizes the performance of proxy networks and reduces the latency in establishing communications connections from public networks via private networks. In particular, there is a need for developing an approach for optimizing the way that a proxy links a source host with a destination host across private networks without decreasing the overall performance of the network.

BRIEF DESCRIPTION OF THE DRAWINGS

Some embodiments of the present approach are illustrated by way of example, and not in way by limitation, in the figures of the accompanying drawings and in which like reference numerals refers to similar elements and in which:

FIG. 6 is a flow chart depicting an example implementation of a process for reducing latency and optimizing proxy networks according to some implementations.

FIG. 7 is a flow chart depicting an example implementation of a process for reducing latency and optimizing proxy networks according to some implementations.

DETAILED DESCRIPTION

Figure 1:
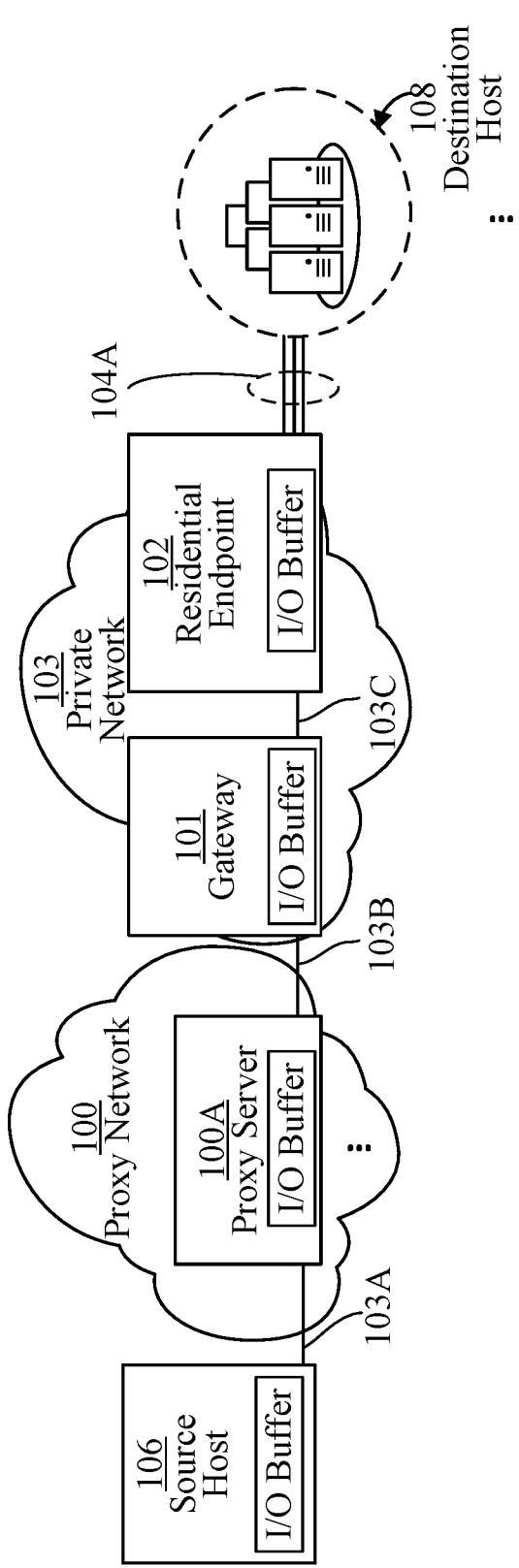
FIG. 1 is a diagram depicting an example proxy network according to some implementations.

In the following description, for the purposes of explanation, numerous specific details are set forth in order to provide a thorough understanding of some embodiments of the present approach. It will be apparent, however, that some embodiments may be practiced without these specific details. In other instances, well-known structures and devices are shown in block diagram form in order to avoid unnecessarily obscuring some embodiments.

The detailed description is organized below according to the following outline:

1.0. OVERVIEW
   1.1. PROCESS OVERVIEW
   1.2. EXAMPLE IMPLEMENTATION 2.0. PROXY NETWORKS
    2.1. FUNCTIONALITIES OF PROXY NETWORKS
    2.2. EXAMPLE PROXY NETWORK
3.0. ESTABLISHING TCP CONNECTIONS
4.0. EXAMPLE APPROACH FOR REDUCING LATENCY IN PROXY NETWORKS
    4.1. OVERVIEW
    4.2. ENCAPSULATION AND DECAPSULATION
    4.3. WIREGUARD
    4.4. IPSEC
    4.5. IPTOIP
    4.6. EXAMPLE IMPLEMENTATION
    4.7. SCALABILITY
5.0. FLOW CHART FOR AN EXAMPLE APPROACH IN WHICH A PROXY SERVER IS AGNOSTIC ABOUT A NAT WITHIN A PRIVATE NETWORK
6.0. FLOW CHART FOR AN EXAMPLE APPROACH THAT IMPLEMENTS VPN CONNECTIONS
7.0. HARDWARE IMPLEMENTATION
8.0. GENERAL CONSIDERATIONS

1.0. OVERVIEW

In some implementations, a method and a system for reducing latency and optimizing proxy networks are disclosed. An example method may be implemented in configurations in which a proxy server establishes a communications connection between the proxy server (configured in a public network) via a private network and a destination host (configured in a public network). The private network may implement one or more gateways that provide security measures for one or more residential endpoints implemented in the same private network.

One of the benefits of the method presented herein is that it helps to overcome the difficulties, complexity, and timing issues related to establishing a communications connection between the proxy server (in a public network) and the destination host (in a public network) via the private network.

While a typical residential endpoint may communicate with a plurality of destination hosts, for the purpose of explaining this approach, the private network herein may be simplified to include one gateway and one residential endpoint, which communicates with one destination host. This, however, should not be interpreted as limiting in any way.

The approach presented herein is particularly useful in situations when a proxy server is configured in a public network while a residential endpoint is configured in a private network, and therefore, the proxy server cannot access the residential endpoint directly. Implemented in such situations, the present method uses a gateway in the private network to establish the connections to the residential endpoint and then to a destination host. Therefore, the present approach includes the mechanisms for speeding up the time-consuming and cumbersome process of establishing the communications connections between the proxy server and the destination host via the gateway and the residential endpoint, both of which are implemented in the private network.

1.1. Process Overview

In some implementations, a method and a system for reducing latency and optimizing proxy networks is presented. The example system may be implemented in one or more computer network devices, each of which comprises one or more computer processors, storage media, and instructions stored in the storage media. According to the approach presented herein, the computer network device is implemented as a proxy server.

Execution of the instructions, by the computer processors, may cause the computer processors of the proxy server, configured in a first public network, to establish a communications connection between the proxy server and a destination host (which is configured in a second public network) via network devices (such gateways and residential endpoints) configured in a private network.

According to some examples illustrated later, the network device (e.g., a proxy server) configured in the first public network may be implemented as a server in a proxy network, while the network devices configured in the private network may be implemented as gateways, residential endpoints, and the like. The destination host may be implemented as a datacenter, a server implementing a website, or the like. The details are explained in FIG. 1.

According to the present approach, the communications connection between the network device (e.g., the proxy server implemented in the first public network) and the destination host (implemented in the second public network) via the private network is established in a unique and novel way. More specifically, according to the present approach, the communications connection comprises two or more sub-connections that are established between two or more network devices configured in the private network, but the network device (i.e., the proxy server configured in the first public network) is agnostic of NATs of the network addresses of the network devices configured in the private network. For example, if the communications connection comprises the sub-connections that are established between the network devices (such as the gateway and the residential endpoint in the private network), then the proxy server (implemented in the first public network) needs not to be aware of the NATs of the network address of the residential endpoint since the gateway handles the NATs for the residential endpoint in the private network.

Stating differently, the network device, such as the proxy server configured in the first public network, establishes the communications connection from the proxy server to the destination host via the network devices (such as the gateway and the residential endpoint configured in the private network) without acquiring information about the NATs of the network addresses of the network devices configured in the private network. Therefore, the proxy server neither requests, nor receives, the network addresses of the network devices (such as the residential endpoints and the like) configured in the private network.

1.2. Example Implementation

According to the present approach, in some implementations, establishing, by a proxy server (configured in a first public network a communications connection between the proxy server and a destination host (configured in a second public network) does not involve establishing any TCP communications connection to, and between, the gateways and residential endpoints configured in the private network.

Usually, a gateway(s), implemented in a private network, is configured to handle the NATs for the network devices configured in the private network. For example, the gateway implemented in the private network may be configured to handle the NATs for the residential endpoints, which in turn may communicate with the destination hosts. Therefore, the residential endpoints may use the gateways to handle the NATs of the network addresses of the residential endpoints to provide security measures to the devices implemented in the private network.

In some implementations of the present approach, the sub-connections established between the network devices (such as gateways and residential endpoints) configured in the private network are established according to, for example, Virtual Private Network (VPN) compatible protocols. Examples of such protocols may include WireGuard, Internet Protocol Security (IPsec), or IPtoIP.

WireGuard, IPsec and IPtoIP are implemented using the communications protocols that are simpler (and thus executed faster) than TCP. As explained later, the WireGuard uses a rather simple message-oriented transport layer protocol User Datagram Protocol (UDP), not a TCP. Furthermore, neither IPsec nor IPtoIP uses a TCP.

Since the present approach uses the communications protocols, such as WireGuard, IPsec and IPtoIP, none of which uses the TCP, the establishing of the sub-connections between the network devices within the private network is more efficient than the sub-connections were TCP connections. Furthermore, the approach relies on the gateway to handle the NATs for the private network's devices. That is performed (1) without establishing any TCP communications connection between the proxy server and the gateway, and (2) without establishing any TCP communications connection between the gateway and the residential endpoint. That results in a significant reduction of the network latency and a significant optimization of the proxy networks.

For the reasons described in detail later, establishing the communications connections to, and/or between, gateways and residential endpoints configured in a private network is more efficient than establishing the TCP communications connections to, and/or between, the gateways and residential endpoints in the private network.

Therefore, the disclosed approach allows reducing the latency in establishing a connection between a source host and a destination host via a residential endpoint. More specifically, the approach allows the proxy server to establish a communications connection that comprises sub-connections between the devices in the private network, none of which is a TCP connection.

Furthermore, a proxy server does not need to request, from a gateway in a private network, the NATs of the addresses of the devices configured in the private network. This allows to increase the overall speed of the proxy network and to optimize the performance of the proxy network. Moreover, this allows to save computational resources (e.g., a CPU), storage resources (e.g., memory) and communications resource (e.g., a communications bus) that otherwise would have to be deployed to establish the conventional TCP communications connections via the private network and between the devices within the private network.

2.0. PROXY NETWORKS

Typically, a proxy server acts on behalf of a source host and facilitates communications between the source host and a destination host. The proxy server is usually configured as an intermediary between the source host and the destination host to implement security measures and to act as a shield between the source host and the destination host. Having the proxy as the intermediary prevents the source host and the destination host from being aware of each other network addresses.

Proxy servers may be implemented as networks of proxy servers. A proxy server network may integrate, for example, Web proxy servers configured to handle HTTP requests received from source hosts, transmit the HTTP requests to destination hosts, receive HTTP responses from the destination hosts, and communicate the HTTP responses to the source hosts. The proxy server network may also integrate VPN proxy servers that are configured to handle VPN-based requests and responses. Other types of proxy server networks may also be integrated in the proxy server networks.

2.1. Functionalities of Proxy Networks

The computer hardware and software are presented herein for purposes of illustrating the basic underlying components that may be employed in a proxy network. The present approach, however, is not limited to any particular proxy network configuration. Furthermore, the present approach may be implemented in any type of proxy network capable of supporting the methodologies of the embodiments described herein.

Usually, a proxy server acts as a shield between a source host and a destination host. Having the proxy as the intermediary allows preventing the source host and the destination host from being aware of each other's network addresses and thus from exposing each other to potential threats.

A proxy may implement the shield-functionalities by configuring, on the proxy, a NAT's functionalities, and a multi-hop routing's functionalities for a proper routing of the requests and responses exchanged between the source host and the destination host.

Functionalities of a proxy server acting as an intermediary may be implemented in a variety of ways. According to one approach, the proxy may hide a network address of a source host from a destination host and hide a network address of the destination host from the source host.

Typically, a network address of a computer device implemented in a computer network is defined as an identifier of the device, and may be included in, for example, headers of the communications transmitted to and from the device. Examples of communications protocols used to route the communications between the computer devices include the Internet Protocol (IP), TCP, HTTP, the Voice over IP (VoIP) protocol, VPN, IPsec, and the like.

Conventionally, a TCP proxy, implemented using the SOCKS5 protocol or the HTTP protocol, establishes at least two TCP communications connections to connect a source host and a destination host. Once (1) a communications connection between the source host and the proxy server, and (2) a communications connection (which may have several sub-connections) between the proxy server and the destination host are established, the two communications connections may be "concatenated" and used as a virtual communications link between the source host and the destination host. The virtual link effectively spans the communications connection between the source host and the proxy server and the communications connection between the proxy server and the destination host.

A TCP proxy can be used to forward data between the source host and the destination host without revealing an IP address of the source host to the destination host and without revealing an IP address of the destination host to the source host. To implement that, the proxy may use its own assigned pool of IP addresses that the proxy may use to mask actual IP addresses of other computers. For example, the proxy may mask the IP addresses of source hosts and the IP addresses of destination hosts by assigning the proxy's own IP addresses to the source hosts and to the destination hosts.

2.2. Example Proxy Network

FIGS. 1-2A and 3-5, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIGS. 1-2A and 3-5 are diagrams depicting example proxy networks according to some implementations. Referring to FIGS. 1-2A and 3-5, a proxy server may serve as an HTTP and/or SOCKS5 proxy server (e.g., a Webshare™ proxy server). A source host, a proxy server, a residential endpoint, and a destination host are described in detail later.

A residential endpoint may be implemented, for example, in a private network, such as inside a home network (i.e., behind the NAT reach of the proxy), while a proxy server and a source host may be implemented in a public computer network. A destination host may be implemented in another public network. Therefore, establishing a direct communications connection between the source host and the destination host usually includes connecting the source host to the proxy server in one network, connecting the proxy server to the network devices in the private network, and connecting the network devices in the private network to the destination host in the public network.

Establishing a communications connection from a source host via a proxy server and a residential endpoint, and then to a destination host is usually complex and time-consuming. It may include, for example, the following: (1) the residential endpoint preemptively creates a connection to a gateway in the private network and the gateway preemptively creates a connection from the gateway to the proxy server, (2) the proxy preemptively creates a connection to the source host, (3) a user generates and transmits a request from the source host to the proxy server to connect to the destination host, (4) the proxy server authenticates the user with the authentication credentials (e.g., a username and a password), (5) assuming that the credentials are valid, the proxy server determines and applies connection properties to the connection established with the source host, (6) the proxy server selects the already established preemptive connection to the gateway, and the gateway selects the already established preemptive connection to the residential endpoint, (7) the proxy server transmits the request (received from the user) to the gateway, which forwards it to the residential endpoint, and (8) the residential endpoint forwards the received request to the destination host and establishes a connection to the destination host so that the source host can communicate with the destination host.

The present approach overcomes the limitations of the conventional approaches for many reasons. For example, according to the present approach, the communications connections between the proxy server, the gateway and the residential endpoint are not TCP connections and thus do not require the proxy to perform the NATs of the network addresses of the devices implemented within the private network. Furthermore, the present approach overcomes many implementation problems of the TCP-based approaches. In comparison with the conventional approaches, the present approach reduces the latency and increases the overall network speed.

In FIGS. 1-2A and 3-5, the lines between the various components represent the network connections established by the corresponding network devices. As described in detail later, the network connections may be established in conformance with the HTTP protocol, the SOCKS protocol, VPN, and the like. The types of the communications connections are not to be viewed as limiting the present approach.

As shown in FIGS. 1-2A and 3-5, a proxy network 100 includes one or more proxy servers 100A. Each proxy server 100A may implement many computer components, including CPU (not shown), memory (not shown), storage (not shown), I/O buffer (shown), and the like.

Proxy server 100A may be configured to establish and maintain a communications connection between a source host 106 and one or more destination hosts 108 via, for example, a private network 103.

Proxy network 100 may be operated by a proxy service provider. For example, the proxy service provider may be a datacenter proxy service provider or a residential proxy service provider. Proxy network 100 may encompass many proxy endpoints in datacenters around the world. The purpose of the proxy provider is to allow users to access destination hosts using network addresses registered in different networks, countries, or jurisdictions. This is useful to circumvent network firewall restrictions that prevent access to destination hosts by source hosts that have source network addresses registered in restricted computer networks and/or geographic areas.

Private network 103 includes one or more gateways 101 and one or more residential endpoints 102. Each gateway 101 and each residential endpoint 102 may implement many computer components, including CPU (not shown), memory (not shown), storage (not shown), I/O buffer (shown), and the like.

Gateway 101 and residential endpoint(s) 102 may be configured to establish and maintain a communications connection between the gateway and one or more residential endpoints 102 (which would then connect to one or more destination hosts 108). A residential endpoint may implement an application that runs on an operating system such as Android, iOS, Linux, Windows, tvOS, or Google TV.

For the purposes of providing a clear example, FIG. 1 depicts only a single source host 106 communicating with a single destination host 108. However, the present approach may implement source hosts 106 and many destinations host 108. Furthermore, the present approach may implement many proxy networks 100, each of which may include many proxy servers 100A. Moreover, the present approach may implement many private networks 103, each of which may implement many gateways 101 and many residential endpoints 102.

In some embodiments, source host 106 is an end-user personal computing device such as laptop computer, a desktop computer, a workstation computer, a tablet computing device, or a portable electronic computing device such as a smartphone. Source host 106 could also be an application server computer or a network computing device.

Each of destination hosts 108 may be an application server computer or a network computing device configured to implement a website or other online services in conjunction with other destination hosts. More generally, any type of computing device or network device may be configured to implement each of destination hosts 108.

Each of the computers implementing source host 106, proxy server 100A, gateway 101, residential endpoint 102, or destination host 108 may have assigned a registered network address. The registered network addresses may be assigned by a regional Internet registry such as the African Network Information Center (AFRINIC), the American Registry for Internet Numbers (ARIN), the Asia-Pacific Network Information Centre (APNIC), the Latin America and Caribbean Network Information Centre (LACNIC), and the Reseaux IP Europeens Network Coordination Centre (RIPE NCC). Network address geolocation databases and services exist for resolving a given network address to the geographic region in which it is registered.

Each of residential endpoints 102 is configured in a private network, and each of residential endpoints 102 may have a network address assigned by, for example, one or more gateways 101 implemented in the same private network.

Each of destination hosts 108 may be part of a website that uses a network firewall to restrict access to the website to only source network addresses registered in, for example, the United States. In that case, if source host 106 uses a network address registered in a European country, then source host 106 may not directly connect to each of destination host 108. The network firewall would prevent the direct network connection because the source host' address of the network connection is not registered in the United States. This problem may be solved using, for example, proxy network 100 by allowing source host 106 to access the website using proxy network 100.

As described later, with the help of proxy server 100A, source host 106 may access each of destination hosts 108 by having proxy server 100A establish communications connections with destination hosts 108 via private network 103.

Generally, to request services available from, for example, destination host 108, source host 106 may specify a domain name, website name or other network address of a website of destination host 108 with which a user of source host 106 wants to communicate. In addition, source host 106 may specify a target geographic area which may be a continent, country, city, region or state, or postal code.

At a high level of abstraction, according to the present approach, proxy server 100A preestablishes, with gateway 101, a communications connection 103B in accordance with, for example, WireGuard protocol, IPsec protocol, IPtoIP protocol, or any other VPN-based protocol that does not require the proxy server to use the NATs for the network devices configured within the private network 103. Meanwhile or subsequently, gateway 101 preestablishes, with residential endpoint 102, a communications connection 103C in accordance with, for example, WireGuard protocol, IPsec protocol, IPtoIP protocol, or any other VPN-based protocol. Residential endpoint 102 also preestablishes a communications connection 104A with destination host 108. Connection 104A is usually a TCP communications connection.

In some implementations, proxy server 100A receives a request from a user of source host 106 to access, for example, destination host 108. Based on the request, proxy server 100A utilizes the already preestablished communications connection between the proxy server 100A and gateway 101. Furthermore, the gateway utilizes the already preestablished communications connection between gateway 101 and residential endpoint 102. Then, residential endpoint 102 utilizes the already preestablished communications connection between residential endpoint 102 and destination host 108.

3.0. ESTABLISHING TCP CONNECTIONS

In some implementations, proxy server 100A preemptively establishes a plurality of active communications connections that are active within a certain time period. Some of those connections are TCP connections between proxy server 100A and source host 106.

Furthermore, residential endpoint 102 may also preemptively establish a plurality of active communications connections that are active within a certain time period. Some of those connections are TCP connections between residential endpoint 102 and destination host 108.

Typically, an active TCP communications connection has a connection type. The active TCP communications connection, established by proxy server 100A and having the connection type, may be defined by at least: an IP address of a plurality of IP addresses of the proxy server, an IP address of a plurality of IP addresses of source host 106, and a port identifier of a port of a plurality of ports configured on source host 106. An active TCP communications connection, established by residential endpoint 102 and having the connection type, may be defined by at least: an IP address of a plurality of IP addresses of the residential endpoint, an IP address of a plurality of IP addresses of destination host 108, and a port identifier of a port of a plurality of ports configured on destination host 108.

A TCP communications connection may be established using, for example, a three-way-handshake process.

Figure 2A:
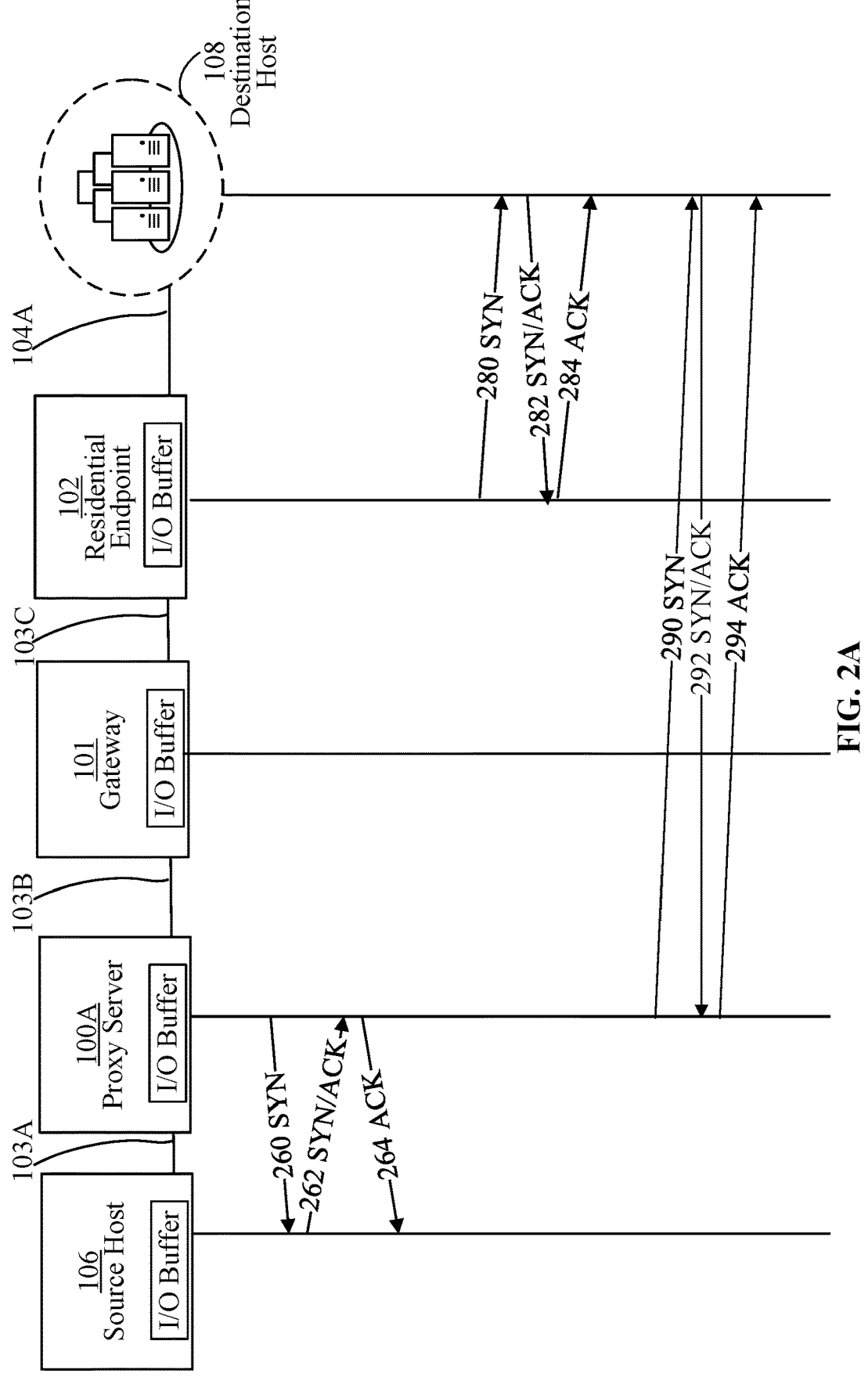
FIG. 2A is a diagram depicting an example process for establishing several TCP communications connections.

FIG. 2A is a diagram depicting an example process for establishing several TCP communications connections. A TCP communications connection 103A is between proxy server 100A and source host 106. A TCP connection 104A is between residential endpoint 102 and destination host 108. There is also a TCP (virtual) communications connection between proxy server 100A and destination host 108.

In FIG. 2A, proxy server 100A preemptively establishes at least one communications connection from proxy server 100A to source host 106. A preemptive connection is a connection established in advance, i.e., prior to, for example, receiving a request from source host 106 to connect to destination 108. Preemptive TCP communications connections between proxy server 100A and source host 106 may be established using, for example, a three-way-handshake process.

As shown in FIG. 2A, to establish preemptive TCP communications connection 103A between proxy server 100A to source host 106, proxy server 100A may initiate a three-way-handshake process with source host 106. More specifically, to initiate the TCP communications connection from proxy server 100A to source host 106, proxy server 100A may transmit a SYN request 260 to source host 106. This may be implemented by setting a SYN flag to 1 and sending a message with the SYN flag to source host 106.

In response, source host 106 may reply with a SYN+ACK message 262 to proxy server 100A.

After receiving SYN+ACK message 262 from source host 106 (with a flag set to "1"), proxy server 100A may respond with an ACK 264 message. Proxy server 100A may also advertise its window size and maximum segment size to source host 106. After completion of this step, preemptive TCP connection 103A is established between proxy server 100A and source host 106.

FIG. 2A also shows that residential endpoint 102 preemptively establishes at least one communications connection from residential endpoint 102 to destination host 108. A preemptive connection is a connection established in advance. Preemptive TCP communications connections between residential endpoint 102 and destination host 108 may be established using, for example, the three-way-handshake process.

As shown in FIG. 2A, to establish preemptive TCP communications connection 104A between residential endpoint 102 to destination host 108, residential endpoint 102 may initiate a three-way-handshake process with destination host 108. More specifically, to initiate the TCP communications connection from residential endpoint 102 to destination host 108, residential endpoint 102 may transmit a SYN request 280 to destination host 108. This may be implemented by setting a SYN flag to 1 and sending a message with the SYN flag to destination host 108.

In response, destination host 108 may reply with a SYN+ACK message 282 to residential endpoint 102.

After receiving SYN+ACK message 282 from destination host 108 (with a flag set to "1"), residential endpoint 102 may respond with an ACK 284 message. Residential endpoint 102 may also advertise its window size and maximum segment size to destination host 108. After completion of this step, preemptive TCP connection 104A is established between residential endpoint 102 and destination host 108.

Furthermore, FIG. 2A shows that proxy server 100A establishes at least one communications connection from proxy server 100A to destination host 108. This communications connection, as shown later, may be virtual and may be established when connections 103A and 104A (described above) and connections 103B and 103C (described later) are already established and when source host 106 sends a request to communicate with destination host 108. Preemptive TCP communications connections between proxy server 100A and destination host 108 may be established using, for example, the three-way-handshake process for each of the communications connections.

As shown in FIG. 2A, to establish a preemptive TCP communications connection between proxy server 100A to destination host 108, proxy server 100A may initiate a three-way-handshake process with destination host 108. To do so, proxy server 100A may transmit a SYN request 290 to destination host 108. This may be implemented by setting a SYN flag to 1 and sending a message with the SYN flag to destination host 108.

In response, destination host 108 may reply with a SYN+ACK message 292 to proxy server 100A.

After receiving SYN+ACK message 292 from destination host 108 (with a flag set to "1"), proxy server 100A may respond with an ACK 294 message. Proxy server 100A may also advertise its window size and maximum segment size to destination host 108. After completion of this step, preemptive TCP connection 104A is established between proxy server 100A and destination host 108.

4.0. EXAMPLE APPROACH FOR REDUCING LATENCY IN PROXY NETWORKS

4.1. OVERVIEW

According to the present approach, to reduce the latency in proxy network 100 and to optimize proxy network 100, proxy server 100A relies, among other things, on communications connections 103B and 103C, shown in FIG. 2A, that are not TCP communications connections, but that are established without having proxy server 100A rely on NATs of network addresses of devices implemented in private network 103.

As described later, communications connections 103B and 103C are established by gateway 101 as non-TCP based communications connections. As also described later, the non-TCP communications connections 103B and 103C may be implemented as VPN-based communications connections established using certain VPN protocols, such as WireGuard (which uses the UDP, not the TCP), IPsec (which relies on the IPsec capabilities, not the TCP), or IPtoIP (which does not rely on the TCP). The above communications protocols and encapsulation/decapsulation used by the protocols are described below.

4.2. Encapsulation and Decapsulation

Figure 2B:
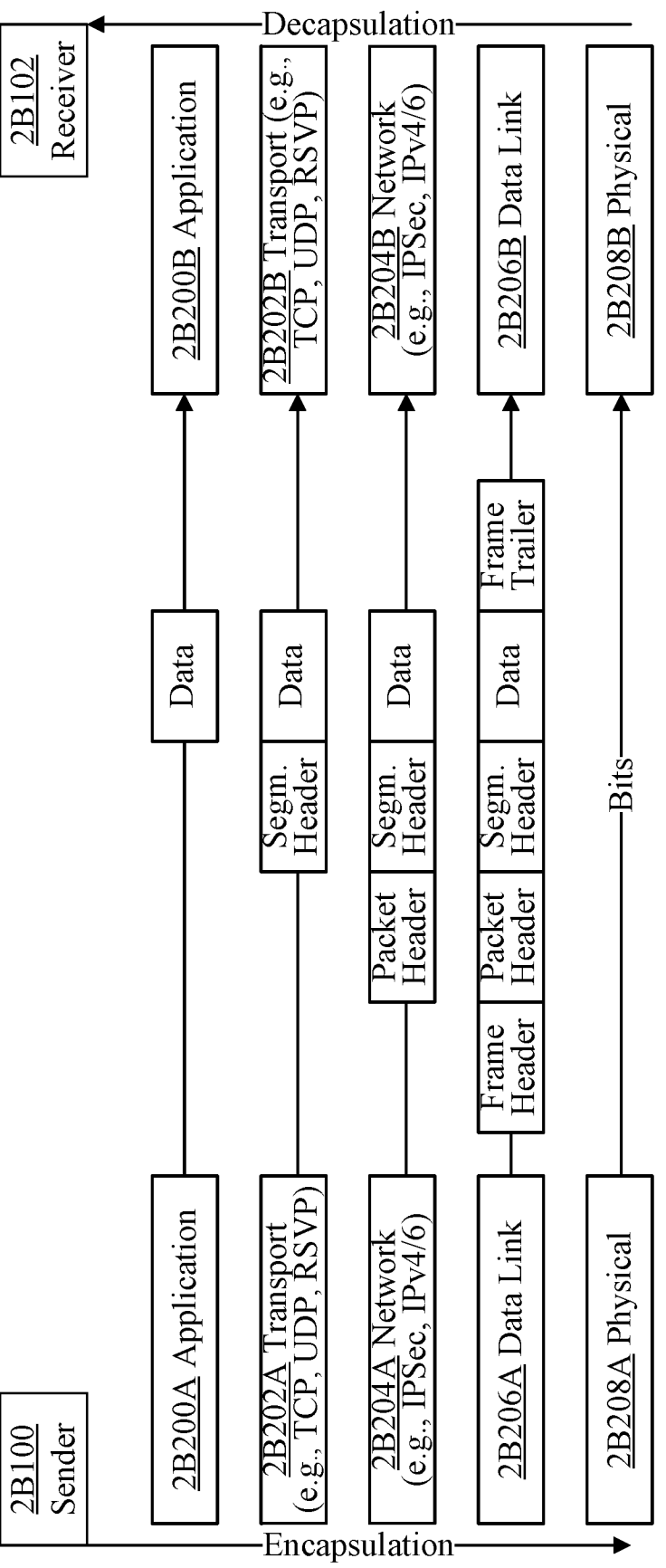
FIG. 2B is a diagram depicting an encapsulation and decapsulation process according to some implementations.

A process of encapsulating and decapsulating data, segments, packets, and frames is depicted in FIG. 2B, which also illustrates examples of commonly used protocols.

FIG. 2B is a diagram depicting an encapsulation and decapsulation process according to some implementation. In FIG. 2B, a sender 2B100 sends data to a receiver 2B102. The encapsulation and decapsulation processes are explained in reference to the Open Systems Interconnection (OSI) model and refers to the sender's side and the receiver's side. On the sender's side, the following is used to encapsulate the data: an application layer 2B200A, a transport layer 2B202A, a network layer 2B204A, a data link layer 2B206A, and a physical layer 2B208A. On the receiver's side, the following is used to decapsulate bits: a physical layer 2B208B, a data link layer 2B206B, a network layer 2B204B, a transport layer 2B202B, and an application layer 2B200B.

On the sender's side, data is buffered by sender 2B100, and then processed by an application layer 2B200A. Then transport layer 2B202A adds a segment header, then network layer 2B204A adds a packet header, then data link layer 2B206A adds a frame header, and finally, physical layer 2B208A sends the bits to receiver 2B102.

Upon receiving the bits by receiver 2B102, the bits are buffered, and then decapsulated by physical layer 2B208B, then by data link layer 2B206B, then by network layer 2B204B, then by transport layer 2B202B, and finally by application layer 2B200B.

4.3. Wireguard

WireGuard is a communication protocol that implements an encrypted VPN. It has been designed to deliver ease of use and high speed performance. It aims for better performance and more power than other tunneling protocols, such as IPsec and OpenVPN.

WireGuard protocol passes traffic over the UDP. As shown in FIG. 2B, the protocols such as TCP, UDP, RSVP, etc., are implemented in transport layer 2B202A. However, since UDP is faster and more efficient than TCP, WireGuard provides some advantages over the implementations that rely on TCP.

UDP is one of the core members of the Internet Protocol (IP) suite. With the UDP, computer applications can send messages, in this case referred to as datagrams, to other hosts on an IP network.

UDP uses a simple connectionless communication model with a minimum of protocol mechanisms. The UDP provides checksums for data integrity, and port numbers for addressing different functions at the source and destination of the datagram. The UDP is suitable for the purposes where error checking and correction are either unnecessary or are performed in the application. The UDP avoids the overhead of such processing in the protocol stack. Time-sensitive applications often use the UDP because dropping packets is preferable to waiting for packets delayed due to retransmission.

WireGuard fully supports IPv6, both inside and outside of the tunnel. It supports only the Layer 3 (i.e., the network Layer 2B204A in FIG. 2B) for both IPv4 and IPv6 and can encapsulate v4-in-v6 and vice versa.

WireGuard aims to provide a simple and effective virtual private network implementation. WireGuard's design aims to make the tunnel more secure and easier to manage by default. By using versioning of cryptography packages, it focuses on ciphers believed to be among the most secure current encryption methods.

4.4. IPsec

IPsec is a secure network protocol suite that authenticates and encrypts packets of data to provide secure encrypted communication between two computers over an IP network. It is used in VPNs.

IPsec includes protocols for establishing mutual authentication between agents at the beginning of a session and negotiation of cryptographic keys to use during the session. The IPsec can protect data flows between a pair of hosts (host-to-host), between a pair of security gateways (network-to-network), or between a security gateway and a host (network-to-host). The IPsec uses cryptographic security services to protect communications over the IP networks. It supports network-level peer authentication, data origin authentication, data integrity, data confidentiality (encryption), and replay protection (protection from replay attacks).

As shown in FIG. 2B, the protocol such as IPsec is implemented in network layer 2B204A. Implementations of IPsec are faster and more efficient than the TCP-based implementations.

4.5. IPtoIP

IPtoIP (also referred to as IPinIP) is an IP tunneling protocol that encapsulates one IP packet in another IP packet. To encapsulate an IP packet in another IP packet, an outer header is added with a source IP, the entry point of the tunnel, and a destination IP, the exit point of the tunnel. In this process, however, the inner packet is unmodified (except a TTL field, which is decremented).

As shown in FIG. 2B, the protocols such as IPv4 and IPv6 are implemented in network layer 2B204A. Hence, implementations of IPtoIP are faster and more efficient than the TCP-based implementations.

4.6. Example Implementation

Figure 3:
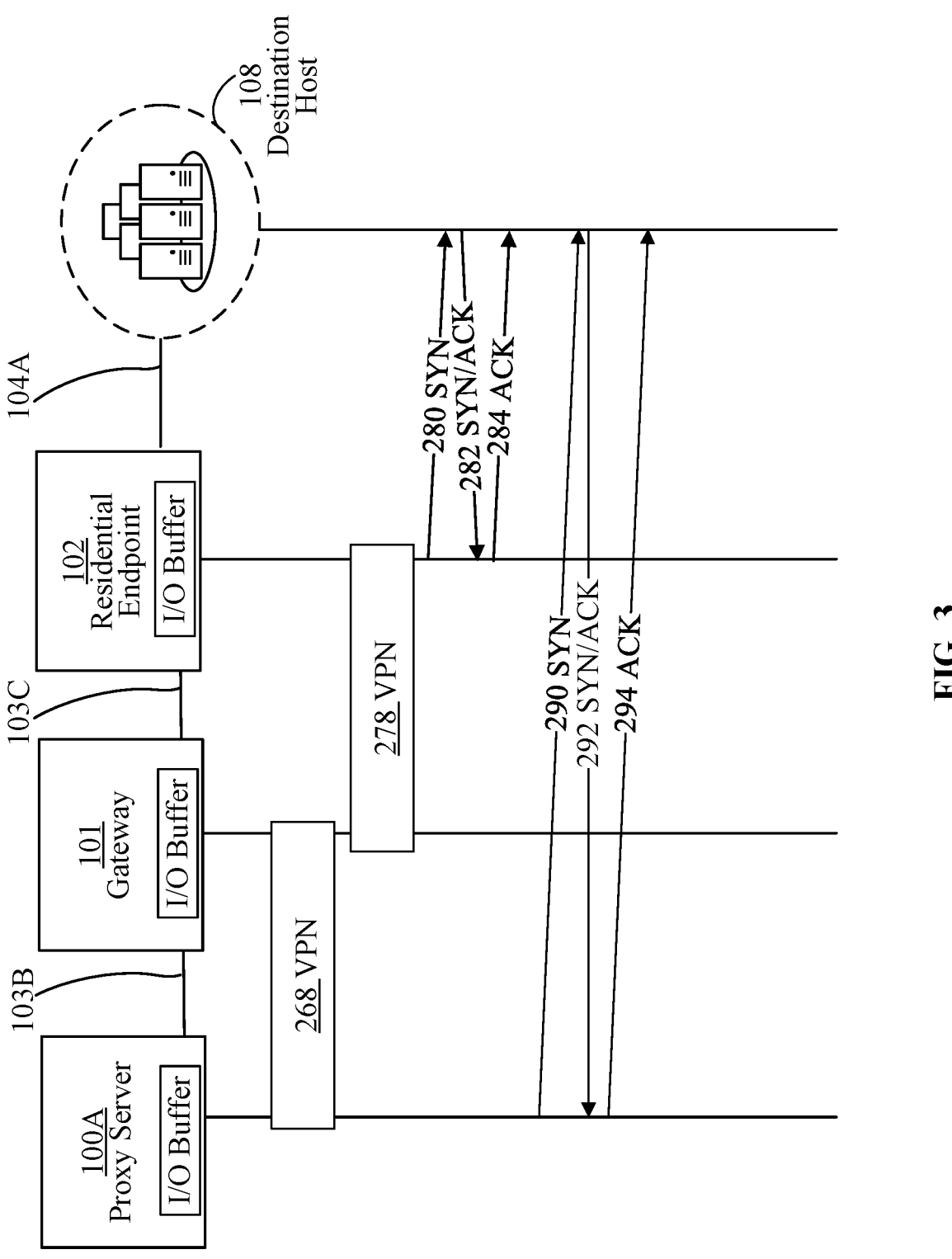
FIG. 3 is a diagram depicting an example proxy connection according to some implementations.
Figure 4:
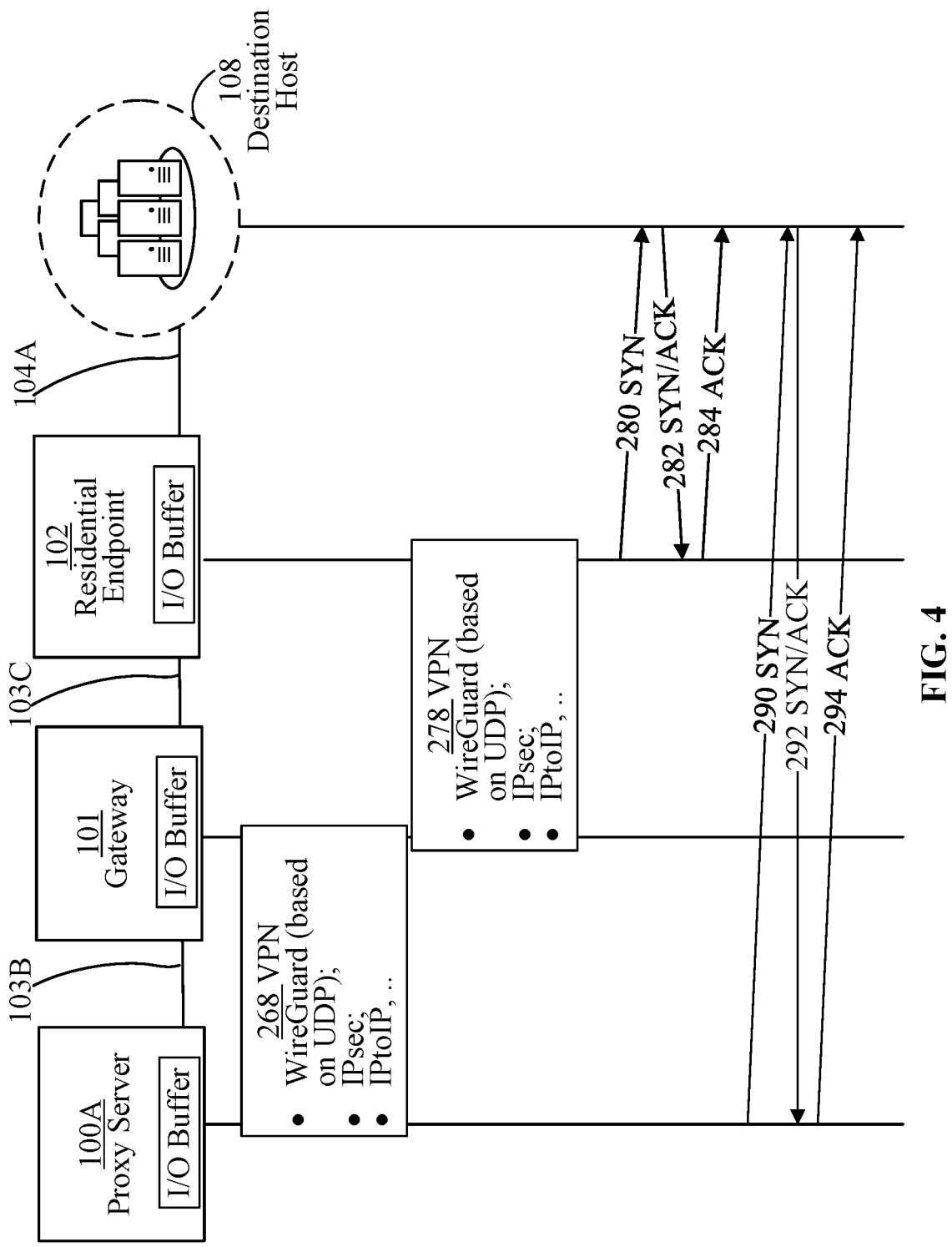
FIG. 4 is a diagram depicting an example proxy connection according to some implementations.
Figure 5:
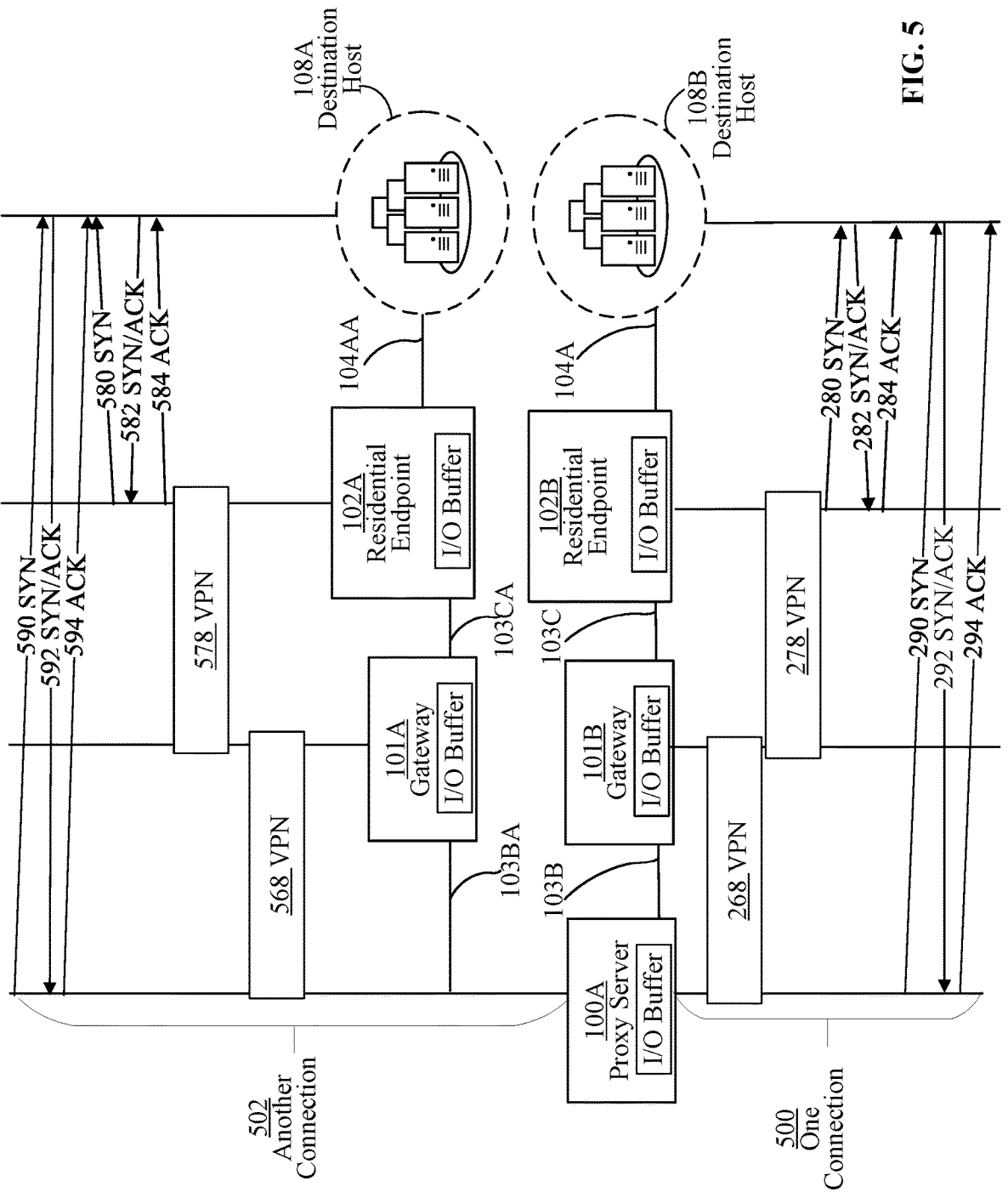
FIG. 5 is a diagram depicting an example proxy connection according to some implementations.

FIG. 3-5 are diagrams depicting an example proxy connection according to some implementations. As described above, the present approach allows reducing the latency in proxy network 100 and optimizing proxy network 100. To achieve that, proxy server 100A relies, among other things, on communications connections 103B and 103C, shown in FIG. 3-4, that are not TCP communications connections, but that are established without having proxy server 100A rely on NATs of network addresses of devices implemented in private network 103.

In some implementations, communications connections 103B and 103C are established by gateway 101 as non-TCP based communications connections. The non-TCP communications connections 103B and 103C may be implemented as VPN-based communications connections established using certain VPN protocols.

In some implementations, as shown in FIG. 4, the non-TCP-based communications connections 103B and 103C are implemented as WireGuard (which uses UDP, not TCP), IPsec (which relies on the IPsec capabilities, not TCP), or IPtoIP (which does not rely on TCP).

In FIG. 3-5, proxy server 100A, configured in the proxy network, establishes the communications connection from proxy server 100A to destination host 108 via gateway 101 and residential endpoint 102 (configured in the private network) without acquiring information about the NATs of the network addresses of residential endpoints 102 configured in the private network. The communications connections 103B and 103C are actually non-TCP-based connections established by gateway 101.

In some implementations, proxy server 100A establishes the communications connection from proxy server 100A to destination host 108 via gateway 101 and residential endpoint 102 (configured in the private network) that are more efficient than if they were TCP-based communications connections. Therefore, the present approach allows to reduce the latency in the proxy network and, as a result, optimizes the performance of the proxy network.

4.7. Scalability

In some implementations, the approach described herein is scaled up to include more than one gateway, more than one residential endpoints, and/or more than one destination host. The scalability may include any combination of additional gateways, additional residential endpoints, and additional destination hosts. Practical implementations may be configured to serve the configurations having hundreds, or millions, of additional network devices.

FIG. 5 is a diagram depicting an example proxy connection according to some implementations. In FIG. 5, proxy server 100A communicates with at least two gateways 101A/101B, at least two residential endpoints 102A/102B, and at least two destination hosts 108A/108B.

In FIG. 5, proxy server 100A establishes at least two communications connections: a connection 500 and a connection 502. Each of the connections 500, 502 is established using the process described in FIG. 3-4. The corresponding VPN-based connections include the connections 268/568, 278/578. Those connections correspond to the connections 103B/103BA, 103C/103CA, respectively. The TCP connections include the connections 104A/104AA.

5. FLOW CHART FOR AN EXAMPLE APPROACH IN WHICH A PROXY SERVER IS AGNOSTIC ABOUT A NAT WITHIN A PRIVATE NETWORK

FIG. 6 is a flow chart depicting an example implementation of a process for reducing latency and optimizing proxy networks according to some implementations.

In step 602, a proxy server, configured in a first public network, establishes a communications connection between the proxy server and a destination host configured in a second public network.

The communications connection established between the proxy server and the destination host comprises two or more sub-connections established between two or more network devices configured in a private network. Examples of the two or more network devices include gateways and residential endpoints, described before.

The communications connection is established in such a way that the proxy server, configured in the first public network, is agnostic of NATs of network addresses of the network devices configured in the private network. That means that the proxy server establishes the communications without acquiring information about the NATs of the network addresses of the network devices such as gateways and residential endpoints configured in the private network.

In some implementations, the establishing, by the proxy server configured in the first public network of the communications connection between the proxy server and the destination host does not involve establishing any TCP-based communications connection to, and between, the two or more network devices configured in the private network. That means that the connection from the proxy server to the gateway and the connection from the gateway to the residential endpoint are not TCP-based communications connections. Indeed, as it was described before, the connection from the proxy server to the gateway is established by the gateway as any non-TCP-based connection, and so is the connection from the gateway to the residential endpoint established by the residential endpoint as any non-TCP-based connection.

Indeed, referring to FIG. 3-4, the communications connections 103B and 103C are non-TCP-based communications connections. As described in FIG. 4, the communications connections 103B and 103C may be established as, for example, WireGuard connections, IPsec connections, IPtoIP connections, or any combinations of the above.

6.0. FLOW CHART FOR AN EXAMPLE APPROACH THAT IMPLEMENTS VPN CONNECTIONS

FIG. 7 is a flow chart depicting an example implementation of a process for reducing latency and optimizing proxy networks according to some implementations.

In step 702, a proxy server configured in a first public network establishes a first VPN-based communications connection (e.g., a first non-TCP-based communications connection) from the proxy server to a gateway computer configured in a private network.

In step 704, the proxy server determines whether a confirmation was received from the gateway computer that a second VPN-based communications connection (e.g., a second non-TCP-based communications connection) has been established between the gateway computer and a residential endpoint (both configured in the private network), and that the residential endpoint has also established a communications connection between the residential endpoint and a destination host. The non-TCP-based communications connections may be established according to for example, one or more of: WireGuard, IPSec, or IPtoIP.

If in step 706, the proxy server determines that the condition set forth in step 704 is satisfied, then the proxy server proceeds to step 708. Otherwise, the proxy server continues testing in step 704.

In step 708, the proxy server establishes a communications connection between the proxy server and the destination host. The communications connection between the proxy server and the destination host includes, as sub-connections, at least the first VPN-based communications connection established between the proxy server and the gateway computer, the second VPN-based communications connection established between the gateway computer and the residential endpoint and the communications connection between the residential endpoint and the destination host.

In step 710, the proxy server transmits data between a source host and the destination host via the communications connection established between the proxy server and the destination host.

The approach presented herein is particularly applicable in situations when a proxy server (configured in a first public network) attempts to establish a communications connection from the proxy server via a private network to a destination host (configured in a second public network). Since the devices (such as residential endpoints) are configured in the private network, the proxy network cannot access the residential endpoints directly. In such situations, the present method uses a gateway implemented in the private network to establish a connection from the gateway to the proxy server, and on the residential endpoint to establish a connection from the residential endpoint to the gateway. Those connections may be VPN-based connections, not TCP-based connections.

Therefore, the present approach includes the mechanisms for speeding up the time-consuming and cumbersome process of establishing the communications connections between the proxy server and the destination host via the gateway and the residential endpoint, both of which are implemented in the private network.

7.0. HARDWARE IMPLEMENTATION

According to some embodiments of the present approach, the techniques described herein are implemented by at least one computer system. The techniques may be implemented in whole or in part using a combination of at least one server computer or other computer systems that are coupled using a network, such as a packet data network. The computer systems may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computer systems may also combine custom hard-wired logic, ASICs, or FPGAs with custom programming to accomplish the described techniques.

The computer systems may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired or program logic to implement the described techniques, one or more virtual computing machines or instances in a datacenter, or a network of server computers or personal computers.

Figure 8:
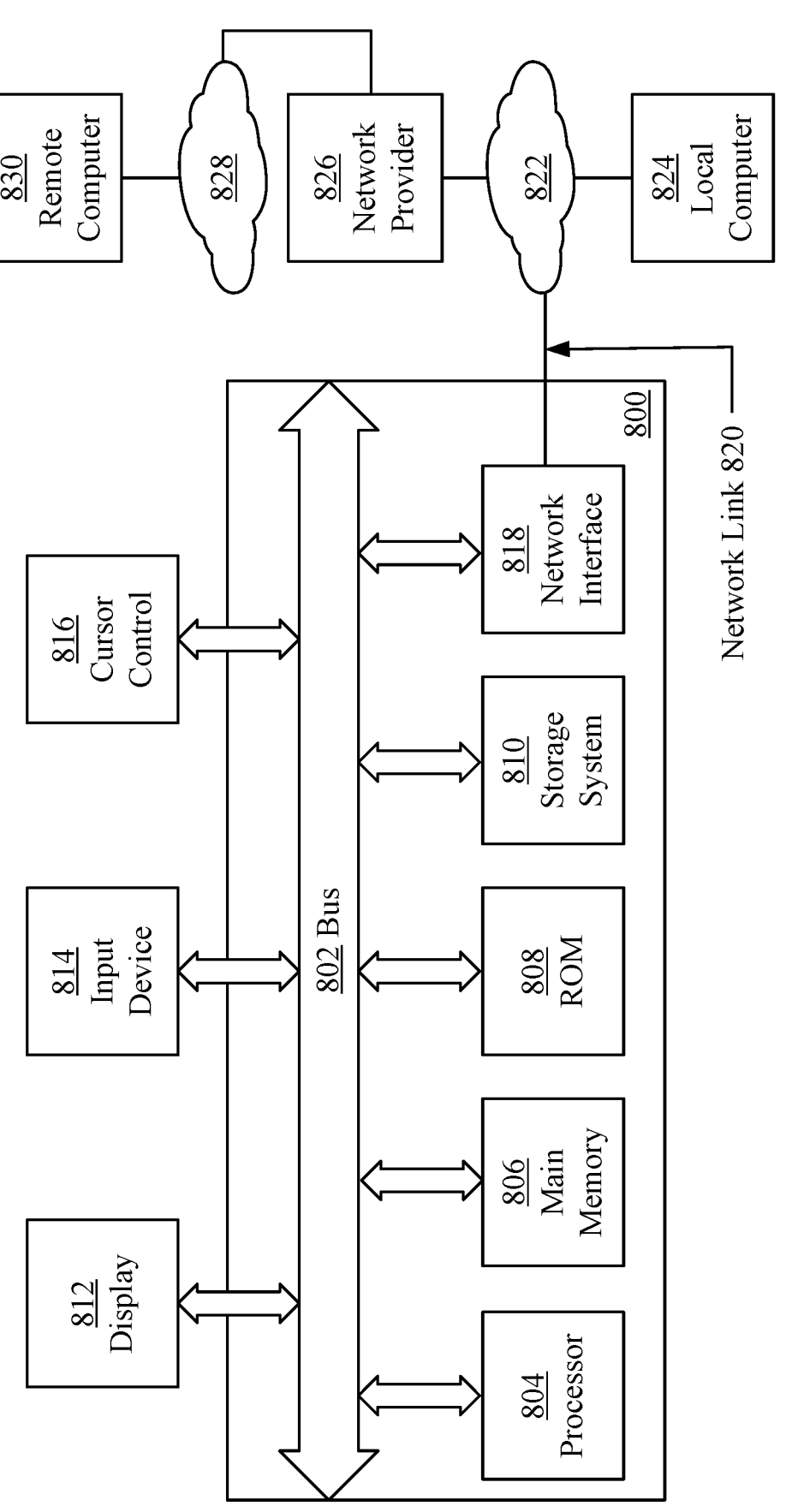
FIG. 8 is a block diagram depicting a computer system upon which some embodiments may be implemented.

FIG. 8 is a block diagram that illustrates an example computer system with which some embodiments may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus or other communication mechanism(s) for communicating information or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 800 may be coupled via I/O subsystem 802 to at least one output device 812. In some embodiments, output device 812 is a digital computer display. Examples of a display that may be used in some embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators, or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In some embodiments, computer system 800 may comprise an internet of things (IoT) device in which one or more of the output devices 812, input device 814, and control device 816 are omitted. In some embodiments, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator, or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware, and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware or program instructions or logic which when loaded and used or executed in combination with the computer system causes or programs the computer system to operate as a special-purpose machine. According to some embodiments, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In some embodiments, hard-wired circuitry may be used in place of or in combination with software instructions.

The term "storage media" as used herein refers to any non-transitory media that store data or instructions that cause a machine to operate in a specific fashion. Such storage media may comprise non-volatile media or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication network, such as a network 822 or a public or private cloud on the Internet. For example, communication interface 818 may be an Ethernet networking interface, integrated-services digital network (ISDN) card, cable modem, satellite modem, or a modem to provide a data communications connection to a corresponding type of communications line, for example an Ethernet cable or a metal cable of any kind or a fiber-optic line or a telephone line. Network 822 broadly represents a local area network (LAN), wide-area network (WAN), campus network, internetwork, or any combination thereof. Communication interface 818 may comprise a LAN card to provide a data communications connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic, or optical signals over signal paths that carry digital data streams representing various types of information.

Communication interface 818 can be based on an interconnect technology used for distributed computing systems, supercomputer systems, and high-performance computing systems. For example, communication interface 818 can be based on OMNI-PATH, INFINIBAND, ARIES, NVLINK, TOFU, or Ethernet.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices or computers that are operated by an Internet Service Provider (ISP) 826. ISP 826 provides data communication services through a world-wide packet data communication network represented as internet 828.

A server computer 830 may be coupled to internet 828. Server 830 broadly represents any computer, datacenter, virtual machine, or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or NoSQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In some embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In some embodiments, for security and reliability, an operating system may prevent direct communication between independent processes, providing strictly mediated and controlled inter-process communication functionality.

8.0. GENERAL CONSIDERATIONS

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for the purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage, or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers, or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A network device comprising:
   one or more computer processors;
   storage media; and
   instructions stored in the storage media that, when executed by the one or more computer processors, cause the one or more computer processors to perform:
   establishing, by the network device configured in a first public network, a communications connection between the network device and a destination host configured in a second public network;

wherein the communications connection established between the network device and the destination host comprises two or more sub-connections established between two or more network devices configured in a private network;

wherein the network device configured in the first public network is agnostic of network address translations of two or more network addresses of the two or more network devices configured in the private network, wherein the two or more network devices comprise a gateway device that is configured to handle the network address translations for the two or more network devices configured in the private network, and wherein the two or more network devices further comprise a residential endpoint device, and the two or more sub-connections comprise:

a first sub-connection between the network device configured in the first public network and the gateway device;

a second sub-connection between the gateway device and the residential endpoint device; and a third sub-connection between the residential endpoint device and the destination host.

2. The network device of claim 1, wherein the network device, configured in the first public network, establishes the communications connection from the network device and the destination host via the two of more network devices configured in the private network without acquiring information about the network address translations of the two or more network addresses of the two or more network devices configured in the private network.

3. The network device of claim 1, wherein establishing, by the network device configured in the first public network, the communications connection between the network device and the destination host does not involve establishing any Transfer Communications Protocol (TCP) communications connection to, and between, the two or more network devices configured in the private network.

4. The network device of claim 3, wherein establishing, by the network device configured in the first public network, the communications connection between the network device and the destination host has a lower latency than establishing the communications connection that otherwise would include one or more TCP communications connections to, or between, the two or more network devices configured in the private network.

5. The network device of claim 1, wherein the network device is a proxy server.

6. The network device of claim 1, wherein the network address translations of a network address of the residential endpoint device is handled by another device configured in the private network.

7. The network device of claim 1, wherein one or more sub-connections established between two or more network devices configured in the private network are established according to one or more of: WireGuard, IPSec, or IPtoIP.

8. The network device of claim 1, wherein the first sub-connection and the second sub-connection are VPN-based connections, and the third sub-connection is a TPC-based connection.

9. The network device of claim 1, wherein the residential endpoint has a network address assigned by the gateway device, and wherein a sub-connection of the two or more sub-connections is preemptively established, with respect to the communications connection between the network device and the destination host, between the gateway device and the residential endpoint device.

10. A computer-implemented method comprising:

establishing, by a network device configured in a first public network, a communications connection between the network device and a destination host configured in a second public network;

wherein the communications connection established between the network device and the destination host comprises two or more sub-connections established between two or more network devices configured in a private network;

wherein the network device configured in the first public network is agnostic of network address translations of two or more network addresses of the two or more network devices configured in the private network, wherein the two or more network devices comprise a gateway device that is configured to handle the network address translations for the two or more network devices configured in the private network, and wherein the two or more network devices further comprise a residential endpoint device, and the two or more sub-connections comprise:

a first sub-connection between the network device configured in the first public network and the gateway device;

a second sub-connection between the gateway device and the residential endpoint device; and a third sub-connection between the residential endpoint device and the destination host.

11. The computer-implemented method of claim 10, wherein the network device, configured in the first public network, establishes the communications connection from the network device and the destination host via the two of more network devices configured in the private network without acquiring information about the network address translations of the two or more network addresses of the two or more network devices configured in the private network.

12. The computer-implemented method of claim 10, wherein establishing, by the network device configured in the first public network, the communications connection between the network device and the destination host does not involve establishing any Transfer Communications Protocol (TCP) communications connection to, and between, the two or more network devices configured in the private network.

13. The computer-implemented method of claim 12, wherein establishing, by the network device configured in the first public network, the communications connection between the network device and the destination host has a lower latency than establishing the communications connection that otherwise would include one or more TCP communications connections to, or between, the two or more network devices configured in the private network.

14. The computer-implemented method of claim 10, wherein the network device is a proxy server.

15. The computer-implemented method of claim 10, wherein the network address translations of a network address of the residential endpoint device is handled by another device configured in the private network.

16. The computer-implemented method of claim 10, wherein one or more sub-connections established between two or more network devices configured in the private network are established according to one or more of: WireGuard, IPSec, or IPtoIP.

17. A computer-readable non-transitory storage media storing one or more computer instructions which, when executed by one or more computer processors, cause the one or more computer processors to perform:

establishing, by a network device configured in a first public network, a communications connection between the network device and a destination host configured in a second public network;

wherein the communications connection established between the network device and the destination host comprises two or more sub-connections established between two or more network devices configured in a private network;

wherein the network device configured in the first public network is agnostic of network address translations of two or more network addresses of the two or more network devices configured in the private network, wherein the two or more network devices comprise a gateway device that is configured to handle the network address translations for the two or more network devices configured in the private network, and wherein the two or more network devices further comprise a residential endpoint device, and the two or more sub-connections comprise:

a first sub-connection between the network device configured in the first public network and the gateway device;

a second sub-connection between the gateway device and the residential endpoint device; and a third sub-connection between the residential endpoint device and the destination host.

18. The computer-readable non-transitory storage media of claim 17, wherein the network device, configured in the first public network, establishes the communications connection from the network device and the destination host via the two of more network devices configured in the private network without acquiring information about the network address translations of the two or more network addresses of the two or more network devices configured in the private network.

19. The computer-readable non-transitory storage media of claim 17, wherein establishing, by the network device configured in the first public network, the communications connection between the network device and the destination host does not involve establishing any Transfer Communications Protocol (TCP) communications connection to, and between, the two or more network devices configured in the private network.

20. The computer-readable non-transitory storage media of claim 19, wherein establishing, by the network device configured in the first public network, the communications connection between the network device and the destination host has a lower latency than establishing the communications connection that otherwise would include one or more TCP communications connections to, or between, the two or more network devices configured in the private network.

* * * * *